United States Patent [19]

Gelardi

[11] Patent Number: 5,799,782

[45] Date of Patent: Sep. 1, 1998

[54] COMPACT DISC CASE

[76] Inventor: John A. Gelardi, P.O. Box 714, Kennebunkport, Me. 04046

[21] Appl. No.: 419,270

[22] Filed: Apr. 10, 1995

[51] Int. Cl.⁶ .................................................. B65D 85/57
[52] U.S. Cl. ........................ 206/308.1; 206/312; 206/1.5
[58] Field of Search ............................... 206/307, 308.1, 206/309, 310, 311, 312, 313, 1.5

[56] References Cited

U.S. PATENT DOCUMENTS

| | | |
|---|---|---|
| 4,635,792 | 1/1987 | Yamada et al. |
| 4,705,166 | 11/1987 | Ackeret. |
| 4,709,812 | 12/1987 | Kosterka. |
| 4,771,890 | 9/1988 | Hofland et al. |
| 4,860,897 | 8/1989 | Fowler et al. |
| 5,101,971 | 4/1992 | Grobecker .................. 206/308.1 X |
| 5,176,250 | 1/1993 | Cheng ........................... 206/309 X |
| 5,205,405 | 4/1993 | O'Brien et al. |
| 5,269,409 | 12/1993 | Brandt et al. |
| 5,360,106 | 11/1994 | Nakayama et al. |
| 5,366,074 | 11/1994 | O'Brien et al. |
| 5,425,448 | 6/1995 | O'Brien et al. |
| 5,477,960 | 12/1995 | Chen. |

*Primary Examiner*—Jacob K. Ackun
*Attorney, Agent, or Firm*—James Creighton Wray; Meera P. Narasimhan

[57] ABSTRACT

A molded plastic tray has a cover with a spline attached to the tray. A latch carried on a leaf spring is connected to the tray opposite the cover spline to hold edges of the cover. The latch-carrying leaf spring snaps inward to retain the cover closed and snaps outward to release the cover. Both top and bottom covers open so that the booklet can be removed from the bottom, and so that fingers may be extended through large corner openings in the tray to assist the removal of the compact disc. The cover has top and bottom rectangular panels hinged to a spline section of the cover. The spline section has holes which receive pins for connecting an overlying connector clip to fix the spline to the rear wall of the tray. Several splines may be hinged together between the panels so that several trays may be positioned between the top and bottom panels.

11 Claims, 7 Drawing Sheets

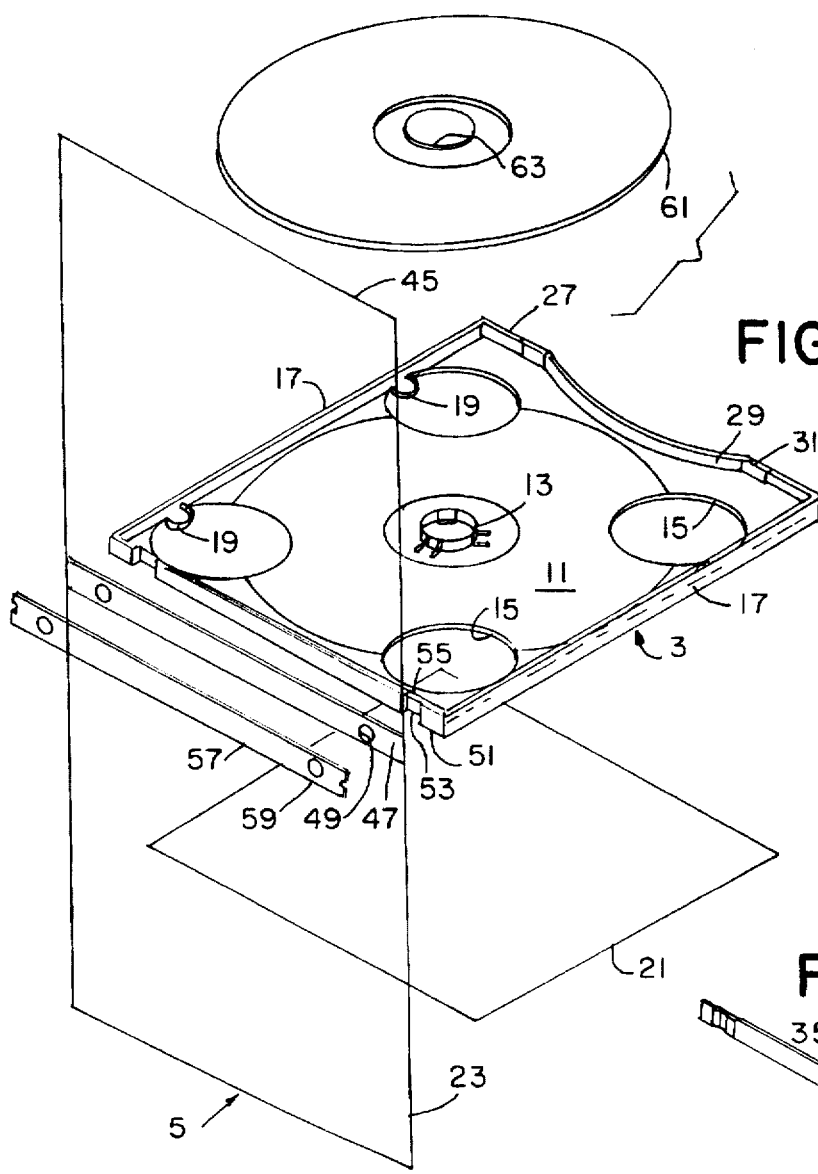
FIG. 6
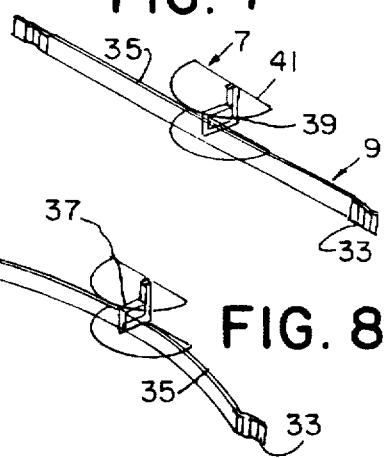
FIG. 7
FIG. 8
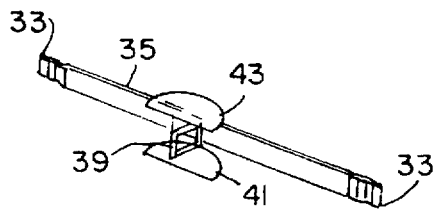
FIG. 12
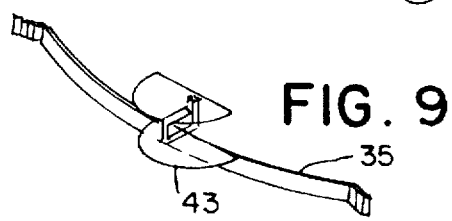
FIG. 9

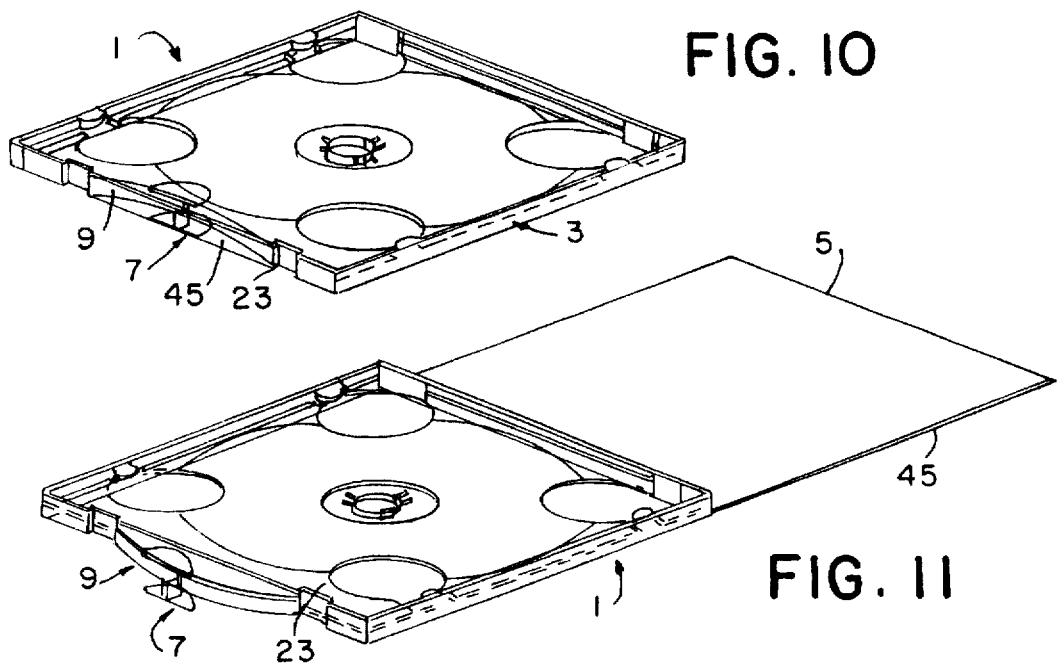
FIG. 10
FIG. 11
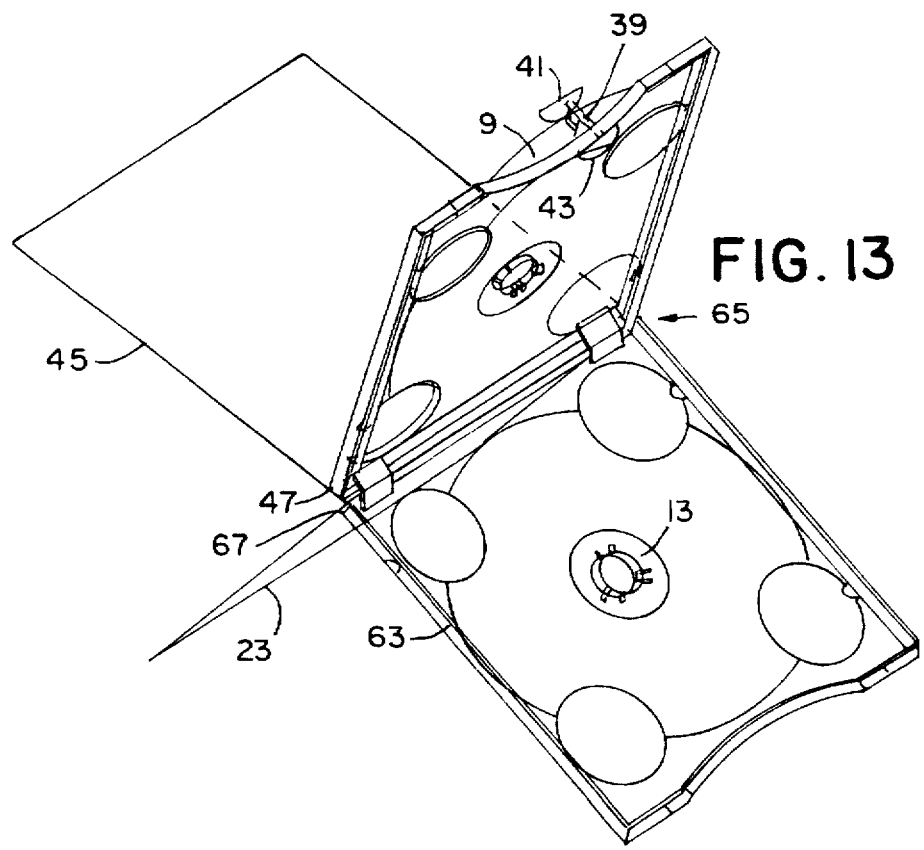
FIG. 13

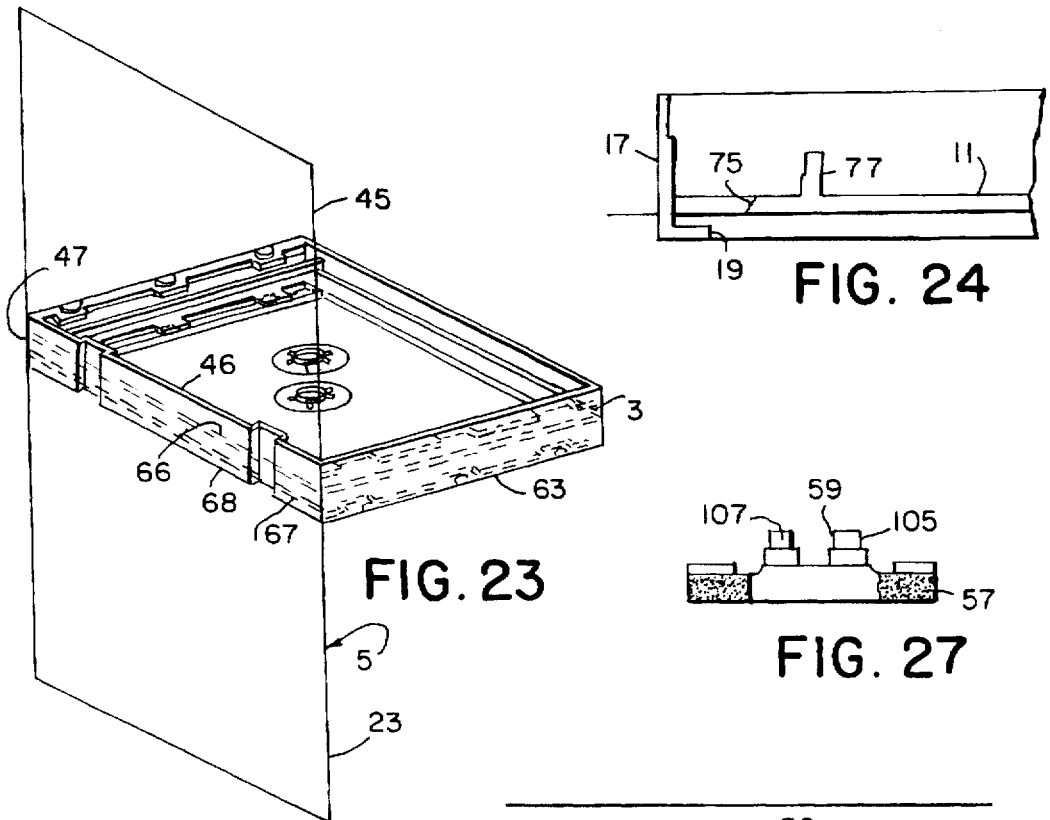
FIG. 23
FIG. 24
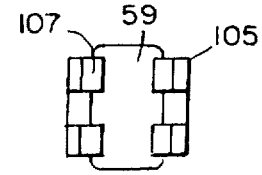
FIG. 27
FIG. 26
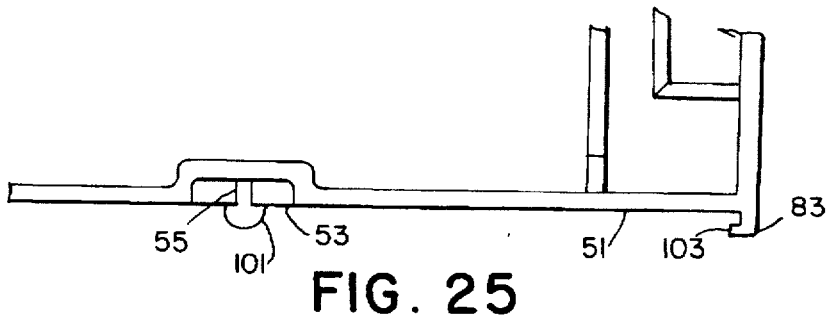
FIG. 25

5,799,782

1

COMPACT DISC CASE

BACKGROUND OF THE INVENTION

Compact disc packaging has relied primarily upon the Jewel box, which is well known and widely used. Compact discs or laser discs which optically store information are expanding wide usage. Demands continue and increase for packaging with improved environmental characteristics, lower costs and lighter weight.

The present invention solves those problems of long standing.

SUMMARY OF THE INVENTION

This invention has a molded plastic tray with a cover attached to the tray at the spline. A latch carried on a leaf spring is connected to the tray opposite the cover spline to hold edges of the cover. The latch snaps inward to retain the cover closed and snaps outward to release the cover. Both top and bottom covers open so that a booklet can be removed from the bottom, and so that fingers may be extended through large corner openings in the tray to assist the removal of the compact disc. The cover has top and bottom rectangular panels or a single top panel hinged to a spline section of the cover. The spline section has holes which receive pins and an overlying connector to fix the spline to the end wall of the tray. Several splines may be joined together so that several trays may be joined together as leaves or a book and may be positioned between the top and bottom panels.

A preferred compact disc case has a molded plastic tray with a central rosette for holding a compact disc and a hinged cover for covering the tray. A leaf spring is mounted at one end of the tray. A clasp is connected to the leaf spring for retaining one end of the cover when the leaf spring and clasp are positioned inward, and for releasing the cover when the leaf spring and clasp are positioned outward.

The leaf spring has ends which slide into receivers in a front wall of the tray. The receivers are spaced apart less than the length of the leaf spring to cause the leaf spring to deform in a curvilinear form either inward or outward. The cover has a top panel and a bottom panel. The clasp retains edges of both the top and bottom panels.

Tabs extend inward from lower edges of side walls of the tray. A bottom panel may be held in fixed position by the tabs. A booklet may be held by the tabs.

The cover has a top panel and a spline, and the top panel is hinged to the spline. The spline has openings for receiving connectors for connecting the spline to a rear wall of the tray.

The connectors have pins or lugs which extend rearwardly from a rear wall of a tray and through the receivers in the spline. A plastic clip extends over the spline and connects to the pins. A plastic clip extends over the spline and connects to the rear wall of the tray through the openings in the spline.

Alternatively posts or lugs extend inward from the clip through the spline receivers into connectors in the rear wall of the tray. Ends of the rear wall of the tray and ends of the clip are constructed with complementary interfitting snaps and openings to join the clip firmly to the rear wall of the tray.

A preferred compact disc storage apparatus has a plastic tray and a cover hinged to a rear of the plastic tray. A clasp at the front of the plastic tray holds the cover closed and releases the cover. The cover has a top panel for covering the tray and compact disc and a spline and a hinge connection interconnecting the top panel and the spline.

2

The spline and top panel are integrally formed. The hinge between the spline and top panel is integrally formed as a line of reduced thickness. The spline has openings for receiving connectors to the tray. A clip extends over the spline and complementary connectors join the connectors through the openings in the spline.

The cover has a bottom panel integrally hinged to the spline for covering a bottom of the tray.

One cover has multiple splines integrally formed and hinged to each other for connecting to multiple trays for forming a multiple pack of compact disc trays.

These and further and other objects and features of the invention are apparent in the disclosure, which includes the above and ongoing written specification, with the claims and the drawings.

BRIEF DESCRIPTION OF THE DRAWINGS

FIG. 6 is an exploded view of the invention, showing the tray without the spring.

FIG. 7 is a detail of the spring and latch in formed position.

FIG. 8 is a detail of the spring and latch in open condition.

FIG. 9 is a detail of the spring in closed condition.

FIG. 10 is a bottom view of the package of the present invention.

FIG. 11 is a bottom view of the package of the present invention in open condition.

FIG. 12 is a bottom view of the spring and latch as formed.

FIG. 13 is a representation of a package having multiple trays and having a cover with upper and lower panels and multiple splines.

FIG. 23 is a perspective view of a preferred multiple tray assembly.

FIGS. 24, 25, 26 and 27 are details of the lugs, posts and snaps and clip gripper connectors respectively.

DETAILED DESCRIPTION OF THE PREFERRED EMBODIMENTS

Figure 1:
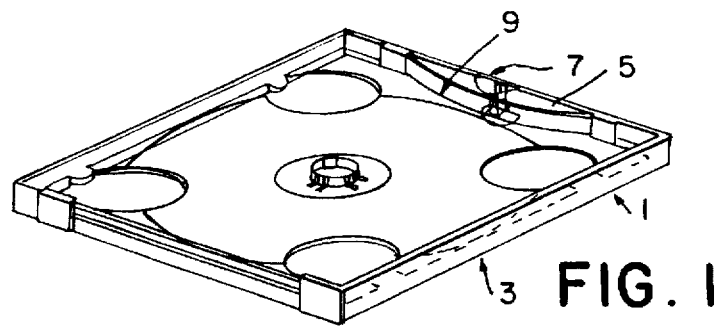
FIG. 1 shows the case of the present invention in closed condition.
Figure 2:
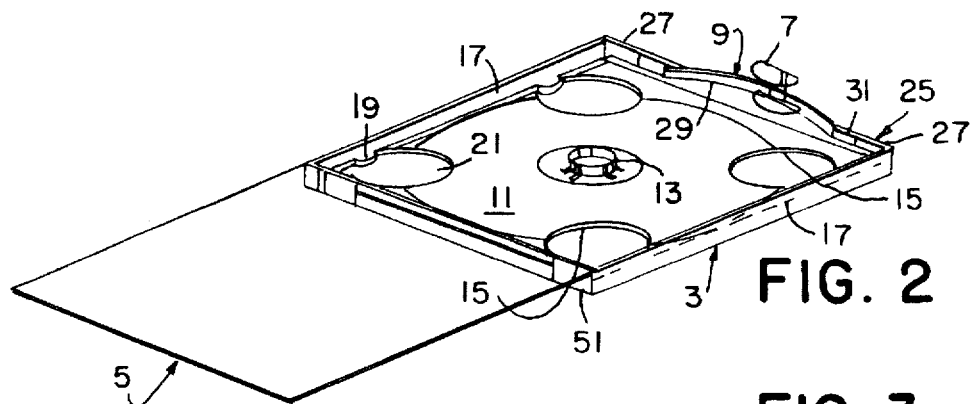
FIG. 2 shows the case of the invention in open condition.
Figure 4:
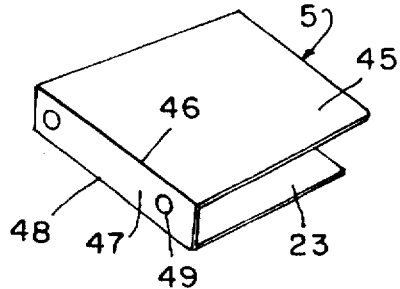
FIG. 4 shows the cover with two flaps and a spline.

FIG. 1 shows a top perspective view of a preferred compact disc case 1 having a tray 3 made of transparent plastic. The cover 5 may be made of plastic or paper board. In the drawings the cover is made of transparent plastic so that features of the tray appear through the transparent plastic cover. The package 1 has a tray 3, a cover 5 and a clasp 7 mounted on a leaf spring 9. Tray 3 as shown in FIGS. 1 and 2 has a base 11 with a centrally mounted rosette 13 for holding a compact disc. The rosette 13 is molded separately and snapped into the tray 3 which may be molded of any suitable material, while maintaining the uniform composition of the rosette. Four large circular corner openings 15 are provided for finger access, either when reaching downward to grasp the circular edge of the compact disc, or when pushing upward from beneath to press the disc upward. The tray has opposite side walls 17. Four tabs 19 project inward from bottom edges of the side walls 17 to hold a booklet 21 within the tray or to prevent the bottom panel 23, as shown in FIG. 4, from opening by holding the panel with the tabs 19.

Figure 3:
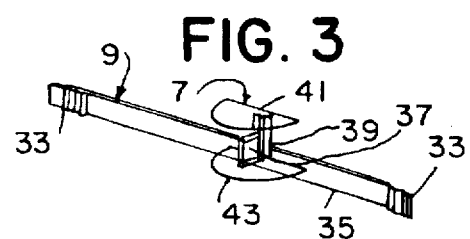
FIG. 3 shows the leaf spring and clasp as formed before being connected to the tray.

The front wall 25 has two end sections 27 and a curved middle section 29, which restricts inward travel of spring 9. The end sections 27 have two inward-facing receivers 31 which receive the stepped ends 33 of spring 9, as shown in FIG. 3. The stepped ends 33 of the spring snap and lock into the receivers 31. The ends 33 may be thicker than the relatively thin portions of the spring 9 near the end. The spring flexes in a wave as it moves between and snaps into its relaxed outward or inward position. Since the spring is always relaxed it is not subjected to compressional creep. The central section 35 of spring 9 is molded in a straight position.

The clasp 7 has an outward extension 37 from spring central section 35. A vertical rib 39 is mounted on the extension 37. Two semi-circular plates 41 and 43 are mounted on ends of the vertical rib 39 to overlie and retain edges of the cover 5 when the spring 9 is in its inward position, as shown in FIG. 1, and to release the outer edges of the cover when the spring 9 is in its outer position, as shown in FIG. 2. Cover 5, as shown in FIG. 4, has an upper panel 45 and a lower panel 23, which are hinged 46 and 48 to an integrally formed spline panel 47. The spline panel has openings 49 which are used to secure the spline on the rear wall 51 of the case.

Figure 5:
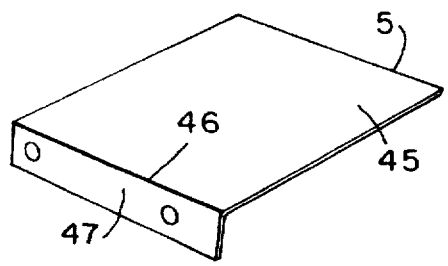
FIG. 5 shows the cover with one flap hinged to the spline.

As shown in FIG. 5, cover 5 has hinged 46 to spline 47 only one flap 45, which covers the upper surface of the tray. The lower surface of the tray is covered by a permanent insert held in place by tabs 19 or a booklet 21 held in place by the tabs.

When the two panels 45 and 23 are used, as shown in FIG. 4, the forward edges of the bottom panel 23 and the top panel 45 are concurrently released when the latch 7 is moved to the open position, providing access to the underside of the tray to remove the booklet and to push the compact disc upward.

Alternatively, the bottom panel 23 may be slid into the bottom of the tray 3 above the lugs 19 to anchor the bottom panel in the tray. Then spline 47 may be folded up and attached to the rear wall 51 of the tray.

FIG. 6 is an exploded view of the compact disc package without the spring and clasp.

As shown in FIG. 6, the rear wall 51 of the tray 3 has recesses 53 in which posts 55 are mounted. The posts 55 extend into the openings 49 in the spline 47 of cover 5. A retainer clip 57, having connectors 59 which connect to ends of the posts, overlies the spline and holds the spline and cover assembled on the tray. Alternately the connectors 59 may be formed in the rear walls 51, and the posts 55 may be formed in the clip 57. Preferably the clip is clear so that any material printed on the spline 47 appears as if the material were printed on the clip 57, or is easily readable through the clip.

The booklet 21 is first placed inside the base of the tray and is held on the tabs 19 after the clip 57 and spline 47 are attached to the rear wall 51 of the tray. Then the compact disc 61 is placed on the tray so that the opening 63 engages the rosette 13.

In the system shown in FIG. 6, when the latch 7 moves inward the latch captures both the upper panel 45 and the lower panel 23. When the latch is moved to the open position, both upper and lower panels are open so that the booklet 21 may be removed and so that the through holes 15 may be used to press the compact disc.

FIG. 7 shows the spring and clasp as formed.

FIG. 8 shows the unlatched position, and FIG. 9 shows the latched position of the spring and clasp.

FIG. 10 shows a bottom view of the assembled compact disc case 1. The transparent lower panel 23 and the transparent top panel 45 are closed, and the latch 7 mounted on spring 9 holds the panels closed. Particularly the upper latch plate 41 holds the panel 45 closed, and the latch plate 43 holds the panel 23 closed.

As shown in FIG. 11, the spring 9 is snapped outward to the position where the panel 23 may be raised. The top panel 45 is open, as shown in the inverted depiction of the case 1. While the cover 5 and the panels 23 and 45 are shown in FIGS. 10 and 11 as clear plastic panels, the panels may be made of paper board.

FIG. 12 shows the spring as molded in the inverted position before it is applied to the inverted position of the case 1, as shown in FIGS. 10 and 11.

FIG. 13 shows an embodiment which uses a second tray 63, which is held by a second spline 67 integrally formed between the first spline 47 and the bottom panel 23. A multiple package 65 results. A similar spring 9 is employed, but the rib 39 is extended so that the upper plate 41 may lie over the upper panel 45 and so that the lower plate 43 may lie under the bottom panel 23. The rib 39 is extended an amount equal to the thickness of the second tray 63. Two identical rosettes 13 are employed so that two compact discs may be held on the trays. When the tray are made double sided and the rosettes 13 are double sided, four compact discs may be held in the package 65 shown in FIG. 13.

Figure 14:
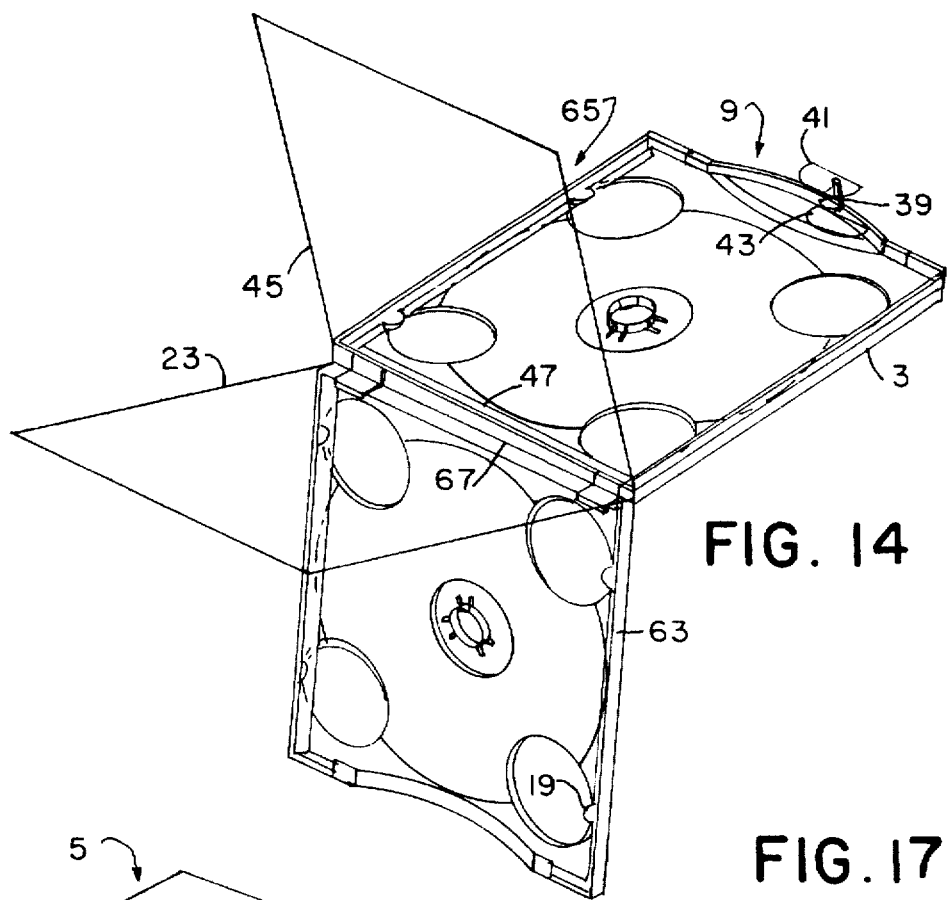
FIG. 14 is a perspective view of a multiple tray package for holding multiple discs.

FIG. 14 is a view taken from a different direction of the double cassette case 65 shown in FIG. 13. As shown, one spring 9 is used with an elongated rib 39, which makes the latch plates 41 and 43 hold the upper and lower panels 45 and 23. Tray 63 is connected to spline 67 in the same manner that tray 3 is connected to spline 47 of the cover.

Figure 15:
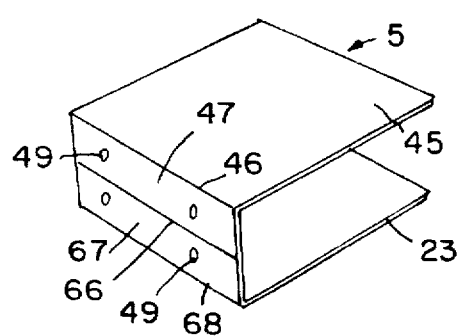
FIG. 15 is a detail of a cover with two splines and two flaps for holding two trays.

FIG. 15 shows the cover used in FIGS. 13 and 14 with the top panel 45, the lower panel 23, the upper spline 47 and the lower spline 67 joined by integrally formed hinges 46, 66 and 68. The openings 49 receive connector posts from the respective trays.

Figure 16:
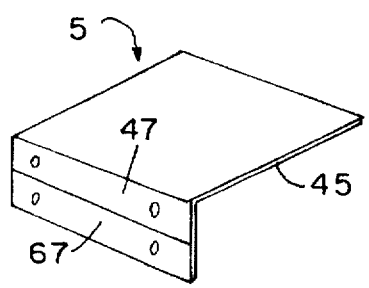
FIG. 16 is a detail of a cover with one flap and two splines for holding multiple trays.

FIG. 16 shows a modified form of the cover 5 in which only the upper panel 45 is used. The lower panel is replaced by a booklet or by an insert which is supported on the tabs 19.

Figure 17:
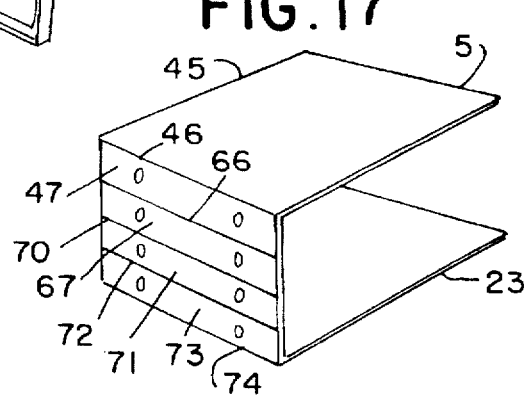
FIG. 17 is a detail of a cover with two flaps and four splines for holding four trays.

FIG. 17 shows a cover 5 which has four splines 47, 67, 71 and 73 joined by integrally formed hinges 46, 66, 70, 72 and 74 for mounting four trays.

The trays are identical, with the exception that a single spring 9 and clasp 7 are connected to one of the trays, and that the rib 39 on the clasp is extended so that both upper and lower panels 45 and 23 are held closed. The spring may be placed on the upper or lower tray or on one of the intermediate trays.

Figure 18:
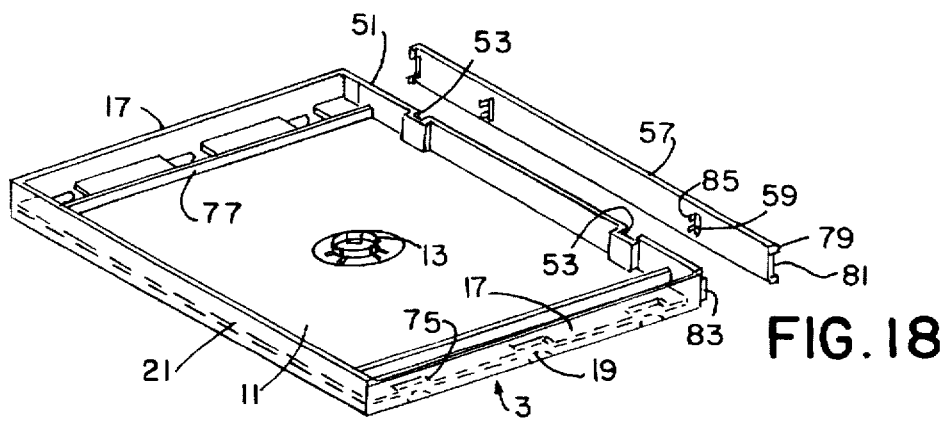
FIG. 18 shows a perspective view of a preferred tray and clip. The spring and clasp have been omitted to emphasize the tray and clip construction.

The tray 3 shown in FIG. 18 is a preferred form from which the spring 9 and clasp 7 have been omitted to emphasize the construction of the tray and of the clip 57.

Each side of the tray base 11 has three rectangular cutouts 75 which are used to form the lugs 19 in the mold. The tray also has inner side walls 77 which are parallel to side walls 17.

Outer edges 79 of the clip have indentations 81 in which snaps 83 attached to the outer edges of the rear wall 51 are received to tightly hold the corners of the clip 57 against the rear wall. The receivers 59 have four prongs 85 for receiving the posts, which project from the recesses 53.

Figure 19:
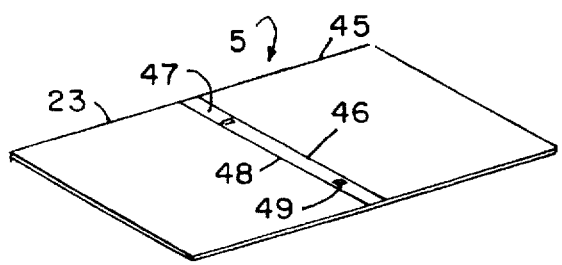
FIGS. 19, 20, 21 and 22 are details of covers.

FIG. 19 shows the cover 5 with the top 45 and the lower panel 23 hinged to spline 47. The openings 49 in the spline are rectangular to receive rectangular posts.

Figure 20:
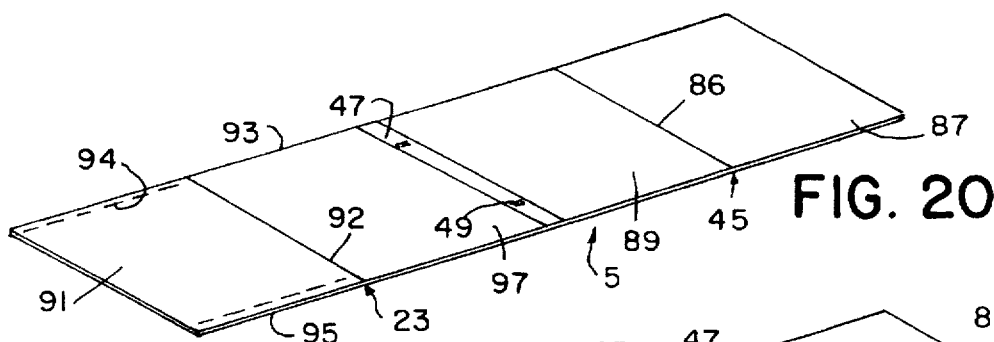

The construction of a paper board cover 5 is shown in FIG. 20. The top panel 45 is formed by folding an elongated sheet along fold line 86 so that panel 87 is folded inward and glued to panel 89, which together form the top 45. Panel 23 is formed by folding the extended panel 91 inward along fold line 92 to cover the inner panel 93. Only the area of the outer panel 91 between the dashed lines 94 is covered with adhesive, so that the outer edge portions 95 and outer edge portions 97 of the inner panel 93 remain separate.

Figure 21:
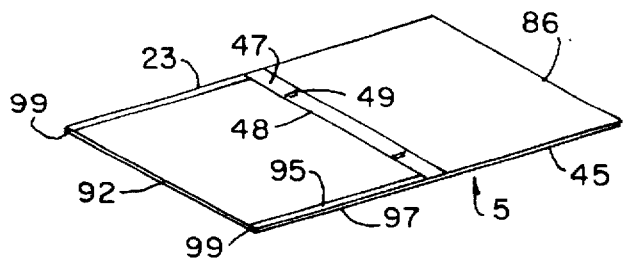

The resulting cover 5, after folding, is shown in FIG. 21. The separated edges 95 and 97, which are free of adhesive, form intermediate slots 99. The grooves 99 may be slid along the lugs 19, anchoring the bottom panel 23 to the bottom of the tray. The spline 47 is then folded upward along the fold line 48 and the rectangular openings 49 receive the pins for connecting the clip to the back wall 51 of the tray 3, capturing the spline 49 between the clip and tray back wall.

Figure 22:
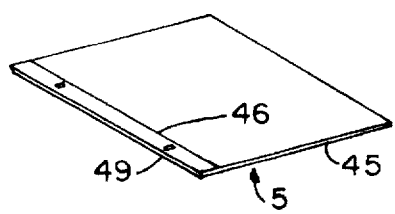

FIG. 22 shows an alternate embodiment of the cover 5 in which only the top panel 45 is joined to the spline 47 along hinge line 46.

FIG. 23 shows a two-tray embodiment of the package using the tray and clip shown in FIG. 18 and the cover shown in FIG. 19, to which a second spline 67 has been added.

FIG. 24 is a detail of the tray 3 showing the opening 75 in the base 11 through which lug 19 is formed. Internal side wall 77 is parallel to side wall 17.

FIG. 25 is a detail of the rear wall 51 showing the recess 53 and the rectangular post 55, with a head 101 which snaps into the receivers 59 on the clip. The snap 83 at the end of rear wall 51 has a lip 103 which engages the outer notch 81 in the end 79 of the clip 57.

FIGS. 26 and 27 are side elevations and cross-sectional details of the receivers 59 and clip 57. Four inward facing pillars 105 flex to permit the passage of head 101 of post 55, but ledges 107 prevent the return of the head of the post, holding the clip and the inter-positioned spline and cover firmly attached to the back wall 51 of the tray 3.

Figure 28:
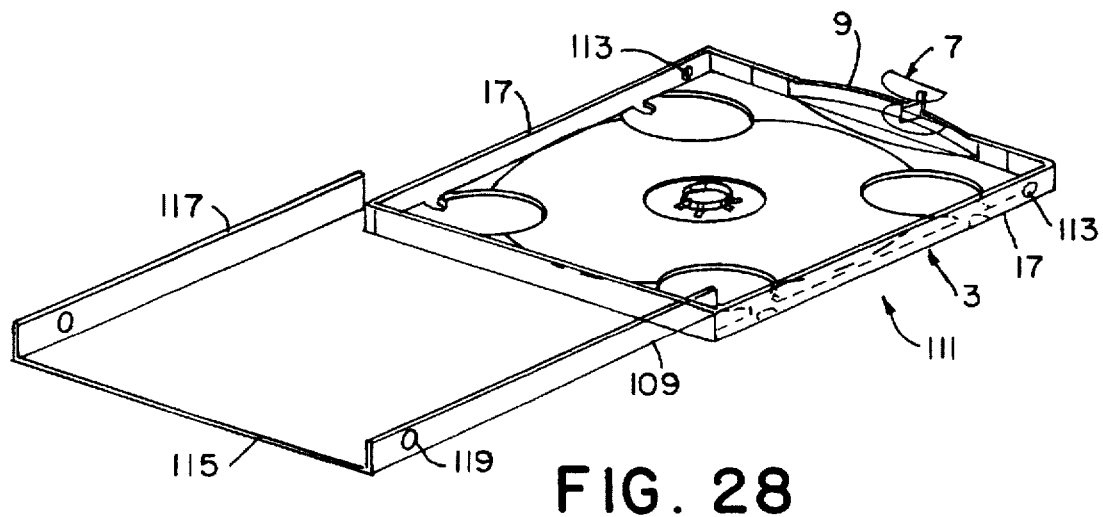
FIGS. 28 and 29 are perspective views of a preferred package with a rigid plastic cover having overlapping side walls.
Figure 29:
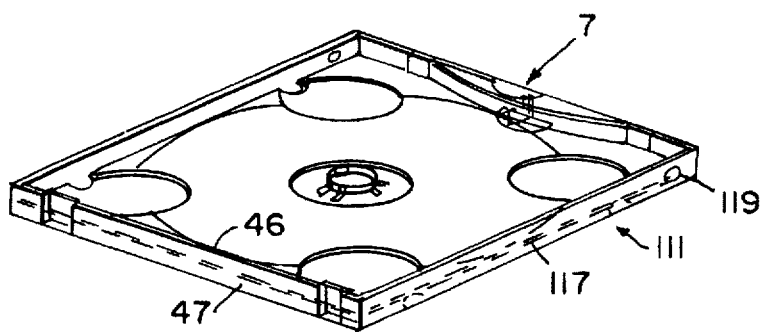

FIGS. 28 and 29 show open and closed positions of a case in which an alternate cover 109 forms a distinct package 111. The tray 3 is essentially the same, with a circular detent which is either an extension or a recess 113 formed on each side wall 17. The cover 109 is formed with a flat portion 115, in this case shown as a clear plastic material, which has side walls 117 which overlap side walls 17 of tray 3. Complementary circular detents 119 engage the detents 113 and hold the cover closed, as shown in FIG. 29. The clasp 7 and spring 9 used in the package 111 are similar to the clasp and spring previously described. The cover panel 115 is mounted on spline 47 through an integrally formed hinge 46.

While the invention has been described with reference to a specific embodiment of the tray and several embodiments of the cover, modifications and variations of the invention may be constructed without departing from the scope of the invention, which is defined in the following claims.

I claim:

1. A compact disc case having a molded plastic tray with a central rosette for holding a compact disc and a hinged cover for covering the tray, a leaf spring mounted at one end of the tray and a clasp connected to the leaf spring for retaining one end of the cover when the leaf spring and clasp are positioned inward, and for releasing the cover when the leaf spring and clasp are positioned outward.

2. The apparatus of claim 1, wherein the leaf spring has ends which snap into receivers in a front wall of the tray.

3. The apparatus of claim 1, wherein the cover comprises a top panel and a bottom panel.

4. The apparatus of claim 3, wherein the clasp retains edges of the top and bottom panels.

5. The apparatus of claim 3, further comprising tabs extending inward from lower edges of side walls of the tray, and wherein the bottom panel is held in fixed position by the tabs.

6. The apparatus of claim 1, wherein the cover comprises a top panel and a spline, wherein the top panel is hinged to the spline, further comprising connectors for connecting the spline to a rear wall of the tray, and wherein the spline has openings for receiving the connectors.

7. The apparatus of claim 6, wherein the connectors comprise pins extending rearwardly from a rear wall of a tray and extending through the openings in the spline, and a plastic clip extending over the spline and connecting the clip and the spline to the pins and to the rear wall of the tray.

8. The apparatus of claim 6, further comprising a plastic clip extending over the spline and connecting to the rear wall of the tray through the openings in the spline.

9. A case having a cover and a tray with opposite side walls, a front wall and a rear wall, the front wall having a recess with receivers in the front wall at ends of the recess, a leaf spring having a clasp for holding and releasing the cover and having ends for fitting in the recesses, a distance between the receivers being less than a length of the spring for selectively deforming the spring inward in the recess for holding the cover with the clasp and deforming the spring outward for releasing the cover.

10. The case of claim 9, wherein the spring has inwardly stepped ends which snap into the receivers.

11. The case of claim 10, wherein the cover further comprises a top panel, a hinge connected to a rear of the top panel and a spline connected to the hinge, and further comprising a clip connected to the rear wall through the spline for attaching the spline to the rear wall.

* * * * *